(12) United States Patent
Ishikawa

(10) Patent No.: US 11,338,874 B2
(45) Date of Patent: May 24, 2022

(54) MOTORCYCLE REAR FENDER STRUCTURE

(71) Applicant: SUZUKI MOTOR CORPORATION, Hamamatsu (JP)

(72) Inventor: Yujiro Ishikawa, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 546 days.

(21) Appl. No.: 16/519,999

(22) Filed: Jul. 23, 2019

(65) Prior Publication Data

US 2020/0079455 A1 Mar. 12, 2020

(30) Foreign Application Priority Data

Sep. 11, 2018 (JP) .............................. JP2018-169786

(51) Int. Cl.
*B62J 11/19* (2020.01)
*B62J 6/04* (2020.01)
*B62J 15/00* (2006.01)
*B62D 25/16* (2006.01)

(52) U.S. Cl.
CPC ............... *B62J 11/19* (2020.02); *B62D 25/16* (2013.01); *B62J 6/04* (2013.01); *B62J 15/00* (2013.01)

(58) Field of Classification Search
CPC ..... B62J 11/19; B62J 6/04; B62J 15/00; B62J 15/02; B62J 15/04; B62D 25/16
See application file for complete search history.

(56) References Cited

U.S. PATENT DOCUMENTS

| 7,543,673 | B2 * | 6/2009 | Lachapelle | ............... B62J 15/00 280/62 |
| 10,131,401 | B2 * | 11/2018 | Nolin | ........................ B62J 15/02 |
| 10,625,802 | B2 * | 4/2020 | Suzuki | ................. B62K 25/005 |
| 2014/0063825 | A1 | 3/2014 | Nakamura et al. | ............ 362/473 |
| 2018/0273126 | A1 * | 9/2018 | Suzuki | ................. B62K 25/005 |
| 2019/0077339 | A1 * | 3/2019 | Futamata | .................. B62L 1/00 |

FOREIGN PATENT DOCUMENTS

JP 2014-61867 A 4/2014

* cited by examiner

*Primary Examiner* — Tony H Winner
*Assistant Examiner* — Michael R Stabley
(74) *Attorney, Agent, or Firm* — Stein IP, LLC

(57) ABSTRACT

There is provided a motorcycle rear fender structure provided at a rear part of a motorcycle. A fender stay extends to an upper rear side from one side of left and right rear swing arms rotatably supporting a rear wheel. A rear fender main body covers an upper rear side of the rear wheel. A bulging portion bulges outward and rearward from the rear fender main body integrally. A wiring chamber is formed in the bulging portion. A partition wall is supported by the fender stay and provided in the rear fender main body. The partition wall is provided with a wiring hole for introducing an electrical wire connected to a lighting device into the wiring chamber. The fender stay is provided with a lower protruding portion extending in a left-right direction at a lower side of the wiring hole in the rear fender main body.

3 Claims, 7 Drawing Sheets

MOTORCYCLE REAR FENDER STRUCTURE

CROSS-REFERENCE TO RELATED APPLICATIONS

The disclosure of Japanese Patent Application No. 2018-169786 filed on Sep. 11, 2018, including specification, drawings and claims is incorporated herein by reference in its entirety.

TECHNICAL FIELD

The present disclosure relates to a motorcycle rear fender structure.

BACKGROUND

In a motorcycle, a rear fender is configured into two parts by a first fender having a hang portion formed to cover a rear side and an upper side of a rear wheel, and a second fender covering the upper side of the rear wheel, such that the second fender suppresses rainwater or the like from entering into the license plate light and to the harness as described in Patent Document 1, for example.

Patent Document 1: Japanese Patent Application Publication No. 2014-061867 A

However, in the rear fender structure as described in Patent Document 1, it is necessary to separately provide a dedicated part (the second fender) in order to prevent water from being applied to the electrical wiring and the mounting part of a lighting device. Therefore, there is a problem that the manufacturing cost increases due to the increase in the number of parts and the number of assembling steps.

SUMMARY

It is at least one of objects of the present disclosure to provide a motorcycle rear fender structure capable of preventing muddy water, rainwater or the like scattered by a centrifugal force of a rear wheel from entering a wiring chamber without increasing the manufacturing cost.

According to an aspect of the embodiments of the present disclosure, there is provided a rear fender structure provided at a rear part of a motorcycle, including: a fender stay extending to an upper rear side from one side of left and right rear swing arms rotatably supporting a rear wheel of the motorcycle; a rear fender main body that covers an upper rear side of the rear wheel; a bulging portion that bulges outward and rearward from the rear fender main body integrally, the bulging portion in which a wiring chamber is formed; and a partition wall supported by the fender stay and provided in the rear fender main body, wherein the partition wall is provided with a wiring hole for introducing an electrical wire connected to a lighting device into the wiring chamber, and the fender stay is provided with a lower protruding portion extending in a left-right direction at a lower side of the wiring hole in the rear fender main body.

With the above configuration, it is possible to prevent muddy water, rainwater or the like scattered by a centrifugal force of a rear wheel from entering a wiring chamber without increasing the manufacturing cost.

DETAILED DESCRIPTION OF THE EMBODIMENTS

A motorcycle rear fender structure according to an embodiment of the present disclosure includes a fender stay extending to an upper rear side from one side of left and right rear swing arms rotatably supporting a rear wheel of the motorcycle; a rear fender main body that covers an upper rear side of the rear wheel; a bulging portion that bulges outward and rearward from the rear fender main body integrally, the bulging portion in which a wiring chamber is formed; and a partition wall supported by the fender stay and provided in the rear fender main body, wherein the partition wall is provided with a wiring hole for introducing an electrical wire connected to a lighting device into the wiring chamber, and the fender stay is provided with a lower protruding portion extending in a left-right direction at a lower side of the wiring hole in the rear fender main body.

According to the motorcycle rear fender structure of the embodiment of the present disclosure, it is possible to prevent muddy water, rainwater or the like scattered by a centrifugal force of a rear wheel from entering a wiring chamber without increasing the manufacturing cost.

Embodiment

Figure 1:
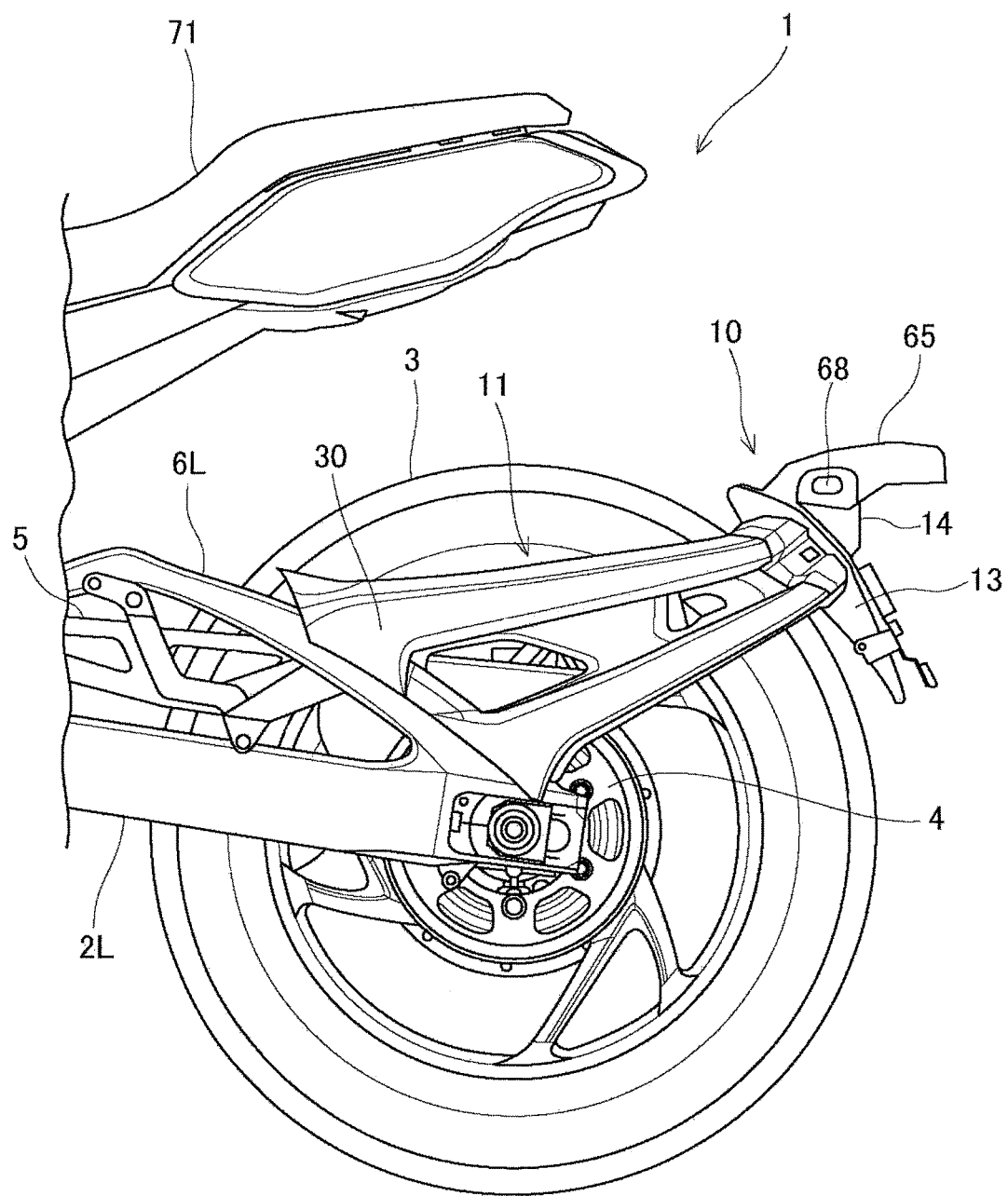
FIG. 1 is a left side view showing a rear part of a motorcycle provided with a rear fender structure according to an embodiment of the present disclosure.
Figure 2:
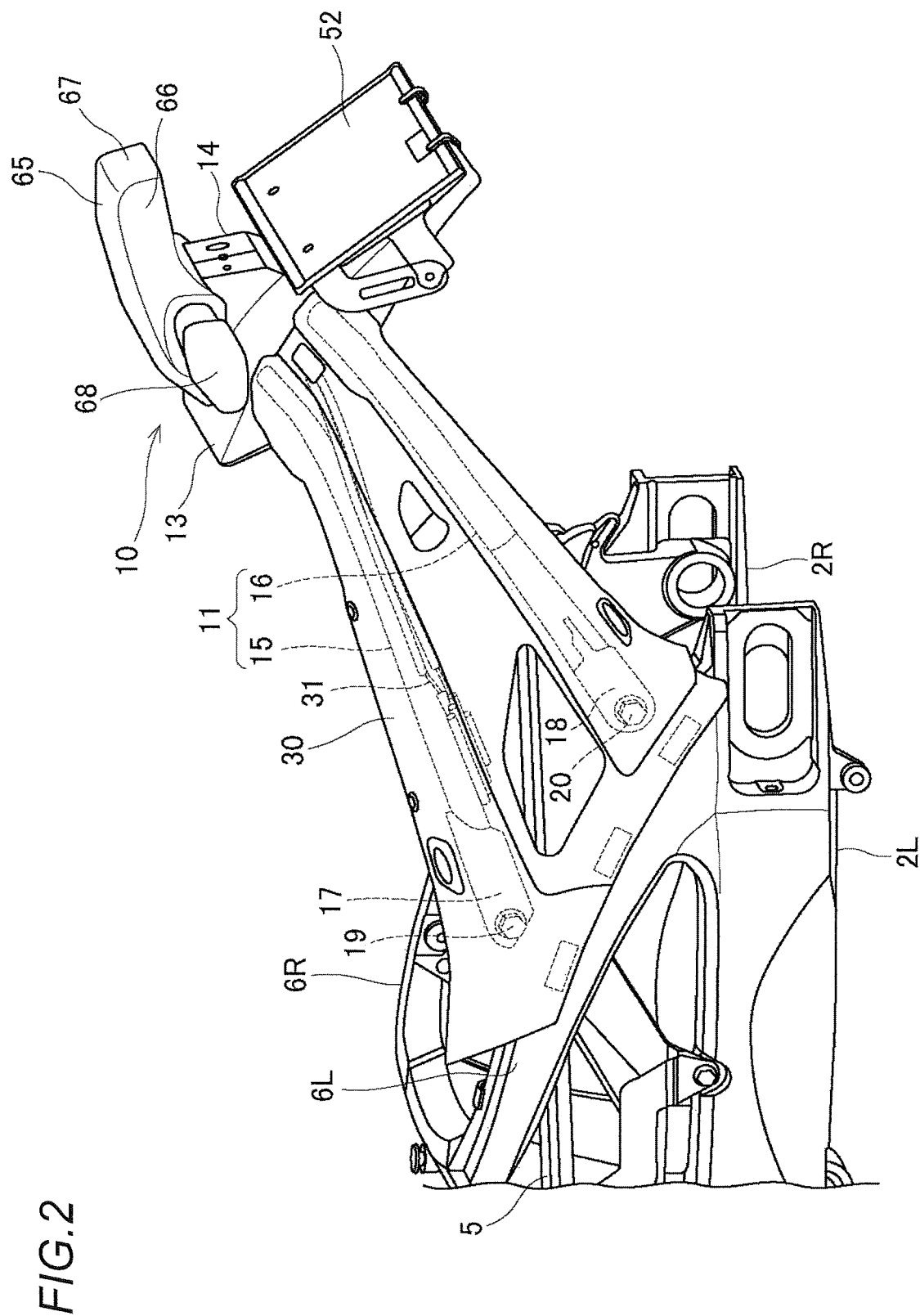
FIG. 2 is a perspective view showing the rear fender structure according to the embodiment of the present disclosure from a rear left side.
Figure 3:
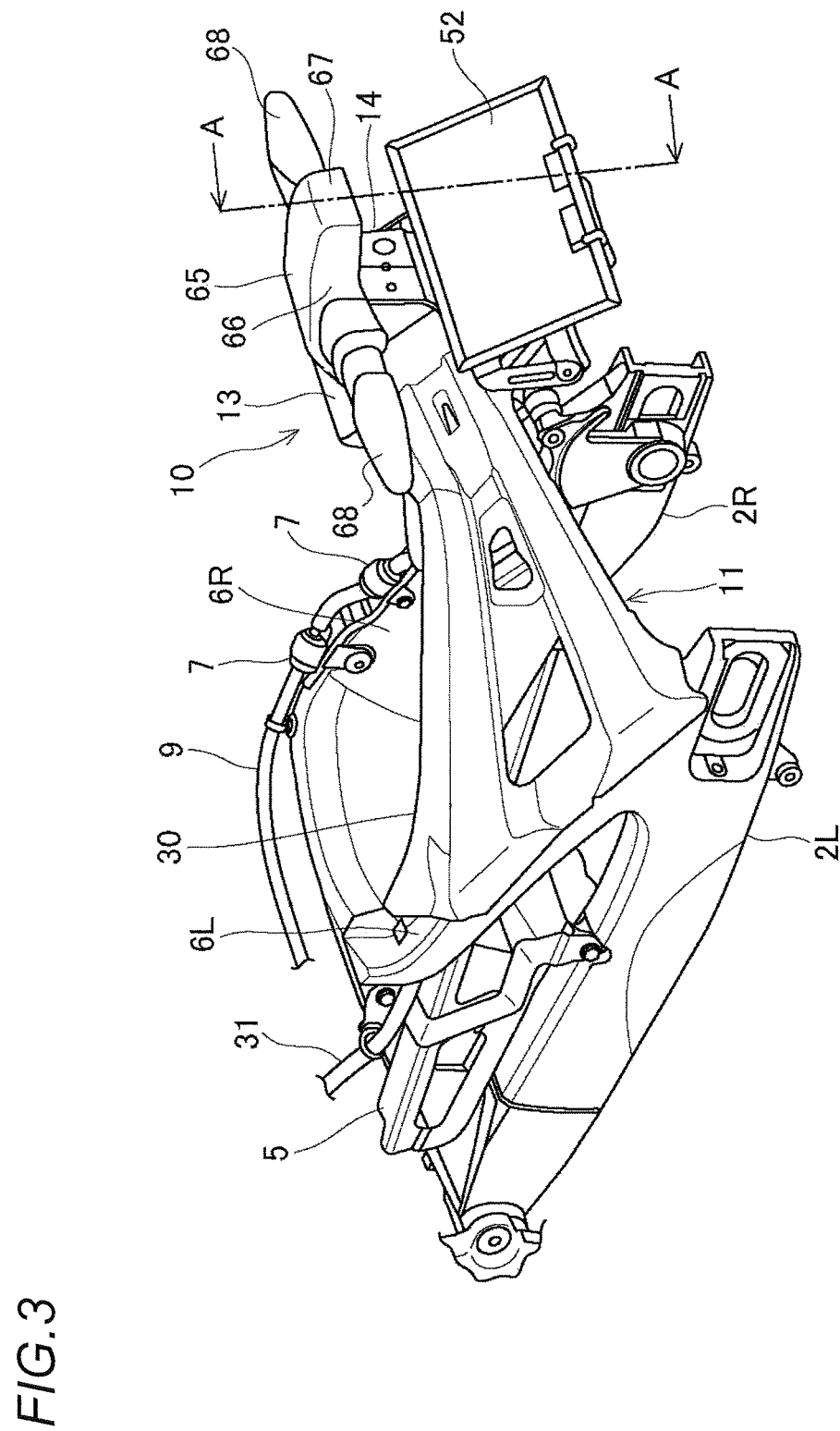
FIG. 3 is a perspective view showing the rear fender structure according to the embodiment of the present disclosure from a rear left side.
Figure 4:
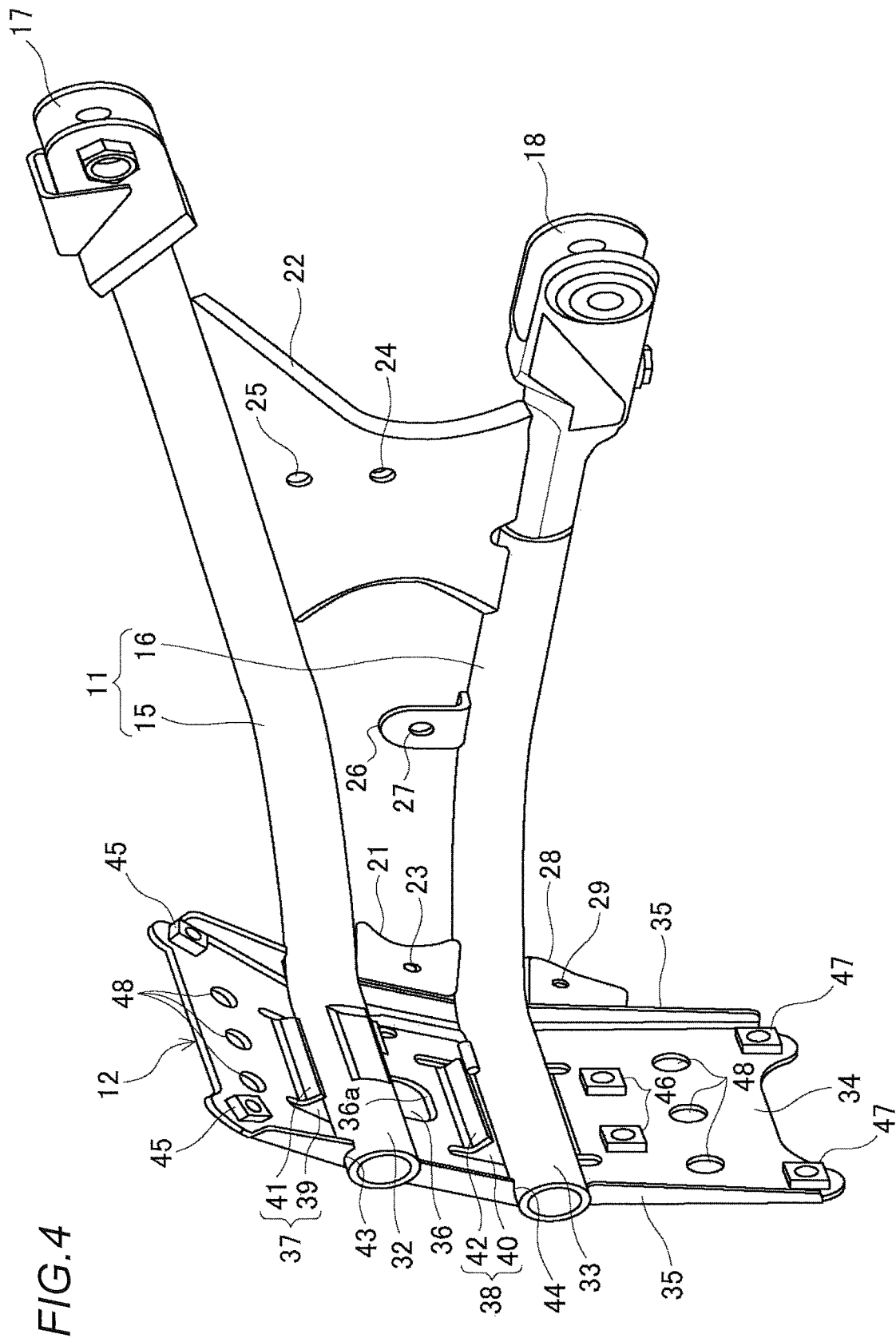
FIG. 4 is a perspective view showing a fender stay and a partition wall of the rear fender structure according to the embodiment of the present disclosure.
Figure 5:
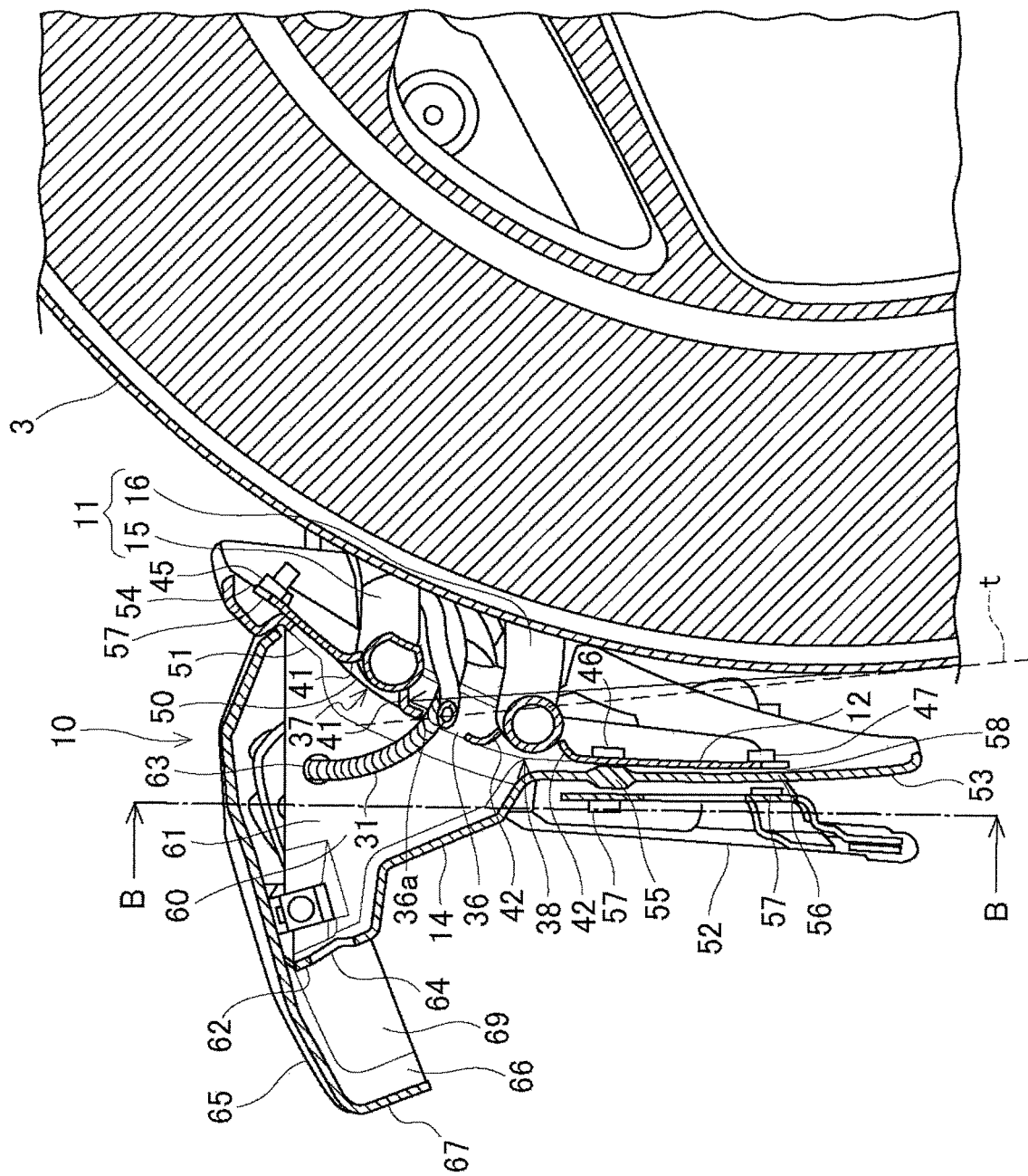
FIG. 5 is a sectional view taken along a line A-A in FIG. 3.
Figure 6:
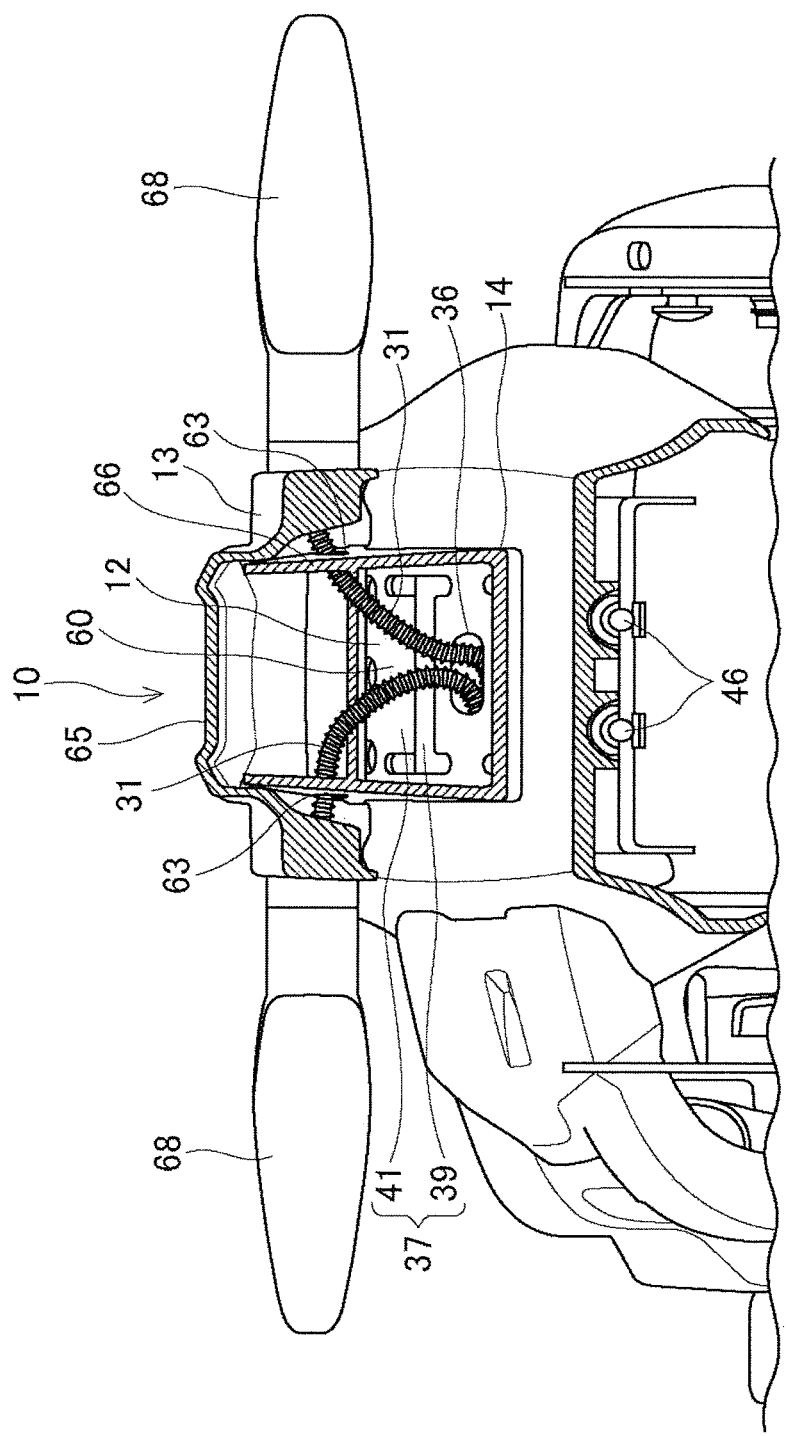
FIG. 6 is a sectional view taken along a line B-B in FIG. 5.
Figure 7:
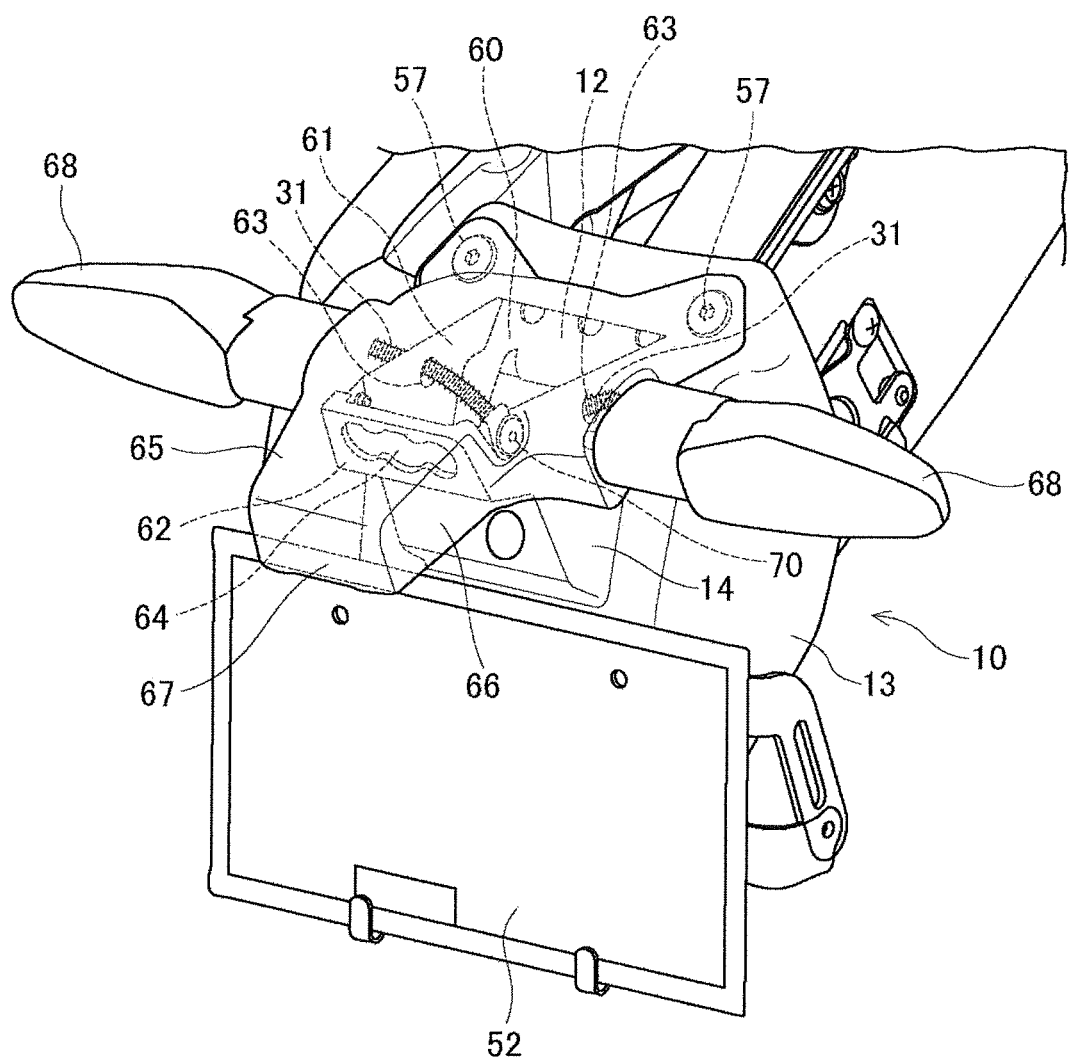
FIG. 7 is a perspective view showing the rear fender structure according to the embodiment of the present disclosure from a rear side.

FIG. 1 is a left side view showing a rear part of the motorcycle provided with a rear fender structure according to an embodiment of the present disclosure; FIG. 2 is a perspective view showing the rear fender structure according to the embodiment of the present disclosure from a rear left side; FIG. 3 is a perspective view showing the rear fender structure according to the embodiment of the present disclosure from a rear left side; FIG. 4 is a perspective view showing a fender stay and a partition wall of the rear fender structure according to the embodiment of the present disclosure; FIG. 5 is a sectional view taken along a line A-A in FIG. 3; FIG. 6 is a sectional view taken along a line B-B in FIG. 5; and FIG. 7 is a perspective view showing the rear fender structure according to the embodiment of the present disclosure from a rear side. When referring to directions in the description of the embodiment of the present disclosure, a driver of the motorcycle is used as a reference.

First, with reference to FIGS. 1 to 3, a schematic configuration of the rear part of a motorcycle 1 provided with a rear fender structure 10 according to the embodiment of the present disclosure will be described.

A pair of left and right rear swing arms 2L, 2R are coupled so as to be swingable in an upper-lower direction at the rear part of the motorcycle 1. As shown in FIG. 1, a rear wheel 3 which is a driving wheel is rotatably supported at a rear part of the rear swing arms 2L, 2R. A driven sprocket 4 is provided on a left side of an axle of the rear wheel 3 so that power of an engine (not shown) is transmitted to the rear wheel 3 by a chain (not shown) wound around the driven sprocket 4. The chain is covered by a chain cover 5 and a brake disc (not shown) for the rear wheel 3 is provided on a right side of the rear wheel 3. A rider seat 71 is disposed on an upper side of the rear wheel 3.

A pair of left and right arm members 6L, 6R are formed toward an upper front direction from respective rear end portions of the pair of left and right rear swing arms 2L, 2R. As shown in FIG. 3, two hose clamps 7 are attached to an upper surface of the right arm member 6R in front and back, and a rear brake hose 9 is fixed along an upper surface of the right arm member 3R by the hose clamps 7.

Next, with reference to FIGS. 1 to 7, the rear fender structure 10 according to the embodiment of the present disclosure will be described.

The rear fender structure 10 according to the embodiment of the present disclosure includes a fender stay 11 extending to an upper rear side from the arm member 6L of the left rear swing arm 2L on which the chain is arranged, a partition wall 12 supported on an upper end portion of the fender stay 11, a rear fender main body 13 covering the upper rear side of the rear wheel 3, and a bulging portion 14 bulging outward and rearward from the rear fender main body 13 integrally.

As shown in FIG. 2 and FIG. 4, the fender stay 11 is provided with elongated cylindrical upper and lower stay pipes 15, 16. Supporting portions 17, 18 are respectively provided at lower end portions of the upper and lower stay pipes 15, 16. The upper stay pipe 15 extends toward the upper rear side in an inclined manner with the supporting portion 17 being fixed by a bolt 19 to an intermediate portion of the left arm member 6L. The lower stay pipe 16 extends toward the upper rear side in an inclined manner with the supporting portion 18 being fixed by a bolt 20 to a lower portion of the left arm member 6L. The inclination of the upper stay pipe 15 is smaller than the inclination of the lower stay pipe 16, and a distance between the upper and lower stay pipes 15, 16 is formed to be narrower toward the upper rear side.

As shown in FIG. 4, a first coupling plate 21 and a second coupling plate 22 for connecting both stay pipes 15, 16 are interposed between the upper and lower stay pipes 15, 16 at an upper end side and a lower end side, respectively. Round holes 23, 24 and 25 are formed at the center of the first coupling plate 21 and at the center of and an upper part of the second coupling plate 22, respectively. A protruding piece 26 protruding upward is attached to the intermediate portion of the lower stay pipe 16, and a round hole 27 is formed in the protruding piece 26. Further, a protruding piece 28 protruding downward is attached to an upper end side of the lower stay pipe 16, and a round hole 29 is formed in the protruding piece 28.

The upper and lower stay pipes 15, 16, the first and second coupling plates 21, 22, and the protruding pieces 26, 27 are covered by an exterior cover 30. The round hole 23 at the center of the first coupling plate 21, the round hole 24 at the center of the second coupling plate 22, and the round holes 27, 29 of the respective protruding pieces 26, 28 are used to fix the exterior cover 30. Further, the round hole 25 on the upper part of the second coupling plate 22 is used to support the electrical wire 31 for the lighting device, which is wired along the upper stay pipe 15 in the exterior cover 30.

An upper protruding portion 32 and a lower protruding portion 33 each having an elongated cylindrical shape are respectively provided on upper end portions of the upper and lower stay pipes 15, 16. The upper protruding portion 32 and the lower protruding portion 33 are parallel to each other and formed to extend in a left-right direction.

As shown in FIG. 4, the partition wall 12 has a longitudinally long bracket plate 34 bent along the rear wheel 3, and left and right folded portions 35 that are bent from left and right edges of the bracket plate 34 to the rear wheel 3 side (lower front side). A first wiring hole 36 is formed slightly above the center of the bracket plate 34. The first wiring hole 36 has an elongated circular shape which is long in the left-right direction.

An upper fixing portion 37 and a lower fixing portion 38 are formed on the upper and lower sides of the first wiring hole 36 in the bracket plate 34, respectively. The fixing portions 37, 38 have openings 39, 40 and upper and lower fixing pieces 41, 42 formed to be bent from upper and lower edges of the openings 39, 40 toward the rear wheel 3 side, respectively. An upper cutout portion 43 and a lower cutout portion 44 are formed in the left and right folded portions 35 at positions corresponding to the upper fixing portion 37 and the lower fixing portion 38, respectively.

The upper protruding portion 32 is welded to the upper and lower fixing pieces 41 of the upper fixing portion 37 and the upper cutout portions 43 on the left and right; and the lower protruding portion 33 is welded to the upper and lower fixing pieces 42 of the lower fixing portion 38 and the lower cutout portions 44 on the left and right. Therefore, the partition wall 12 is fixed to the upper end portion of the fender stay 11. At this time, as shown in FIG. 5, the lower protruding portion 33 is attached so as to protrude to a center side of the rear wheel 3 with respect to a tangent line t to the rear wheel 3 passing through an upper edge 36a of the first wiring hole 36.

On a rear wheel 3 side surface (inner surface) of the bracket plate 34, first fixing nuts 45 are welded to two positions at left and right corners on the upper end side, second fixing nuts 46 are welded to two positions on the a lower side of the lower fixing portion 36, and third fixing nuts 47 are welded to two positions at left and right corners on the lower end side. Further, in order to reduce the weight, through holes 48 are opened at a plurality of positions (six in the illustrated example) of the bracket plate 34.

The rear fender main body 13 is formed by injection molding of resin. As shown in FIG. 5, the rear fender main body 13 includes an upper portion 51 where an opening part 50 is formed, and a lower portion 53 to which a license plate 52 is attached at the rear side. First fixing portions 54 are formed at positions corresponding to the first fixing nuts 45 in an upper part of the upper portion 51, second fixing portions 55 thicker than other parts of the lower portion 53 are formed at positions corresponding to the second fixing nuts 46 in an upper part of the lower portion 53, and third fixing portions 56 are formed at positions corresponding to the third fixing nuts 47 of the lower portion 52.

A first bolt to a third bolt 57 are respectively screwed to the first fixing nuts 45, the second fixing nuts 46 and the third fixing nuts 47 via the first fixing portions 54, the second fixing portions 55 and the third fixing portions 56 from an outer surface side (rear side) of the rear fender main body 13, so that the rear fender main body 13 is fixed to the partition wall 12. Thus, the opening part 50 of the upper portion 51 is closed by the partition wall 12 attached to an inner side of the rear fender main body 13. At this time, since the second fixing portion 54 is formed thick as described above, a gap is formed between the partition wall 12 and the lower portion 52 of the rear fender main body 13. Due to the gap, a drain passage 56 is formed downward along a surface where the partition wall 12 overlaps with an inner surface of the rear fender main body 13.

The bulging portion 14 is formed in a box shape so as to bulge outward and rearward from left and right edges and a lower edge of the opening part 50 of the rear fender main body 13. Left and right side walls 61 and a rear side wall 62 of the bulging portion 14 are integrally formed with the rear fender main body 13, and a wiring chamber 60 is formed therein. In upper portions of the left and right side walls 61 of the bulging portion 14, wiring holes 63 for direction indicator as second wiring holes are formed. In an upper portion of the rear side wall 62 of the bulging portion 14, a wiring hole 64 for license plate lamp as a second wiring hole is formed. The wiring hole 63 for direction indicators and the wiring hole 64 for license plate lamp are formed at positions higher than the first wiring hole 36.

An upper wall of the bulging portion 14 is formed by a removable lid member 65. The lid member 65 has left and right side wall portions 66 and a rear wall portion 67, the left and right side wall portions 66 are formed to cover the wiring holes 63 for direction indicator from the outside, and the rear wall portion 67 is formed to cover the wiring hole 64 for license plate lamp from the outside. Left and right direction indicators 68 are attached to the left and right side wall portions 66 of the lid member 65, respectively. A license plate lamp 69 is disposed in a space between the rear side wall 62 of the bulging portion 14 and the rear wall portion 67 of the lid member 65, and the license plate lamp 69 is attached to the rear side wall 62 of the bulging portion 14. Further, a first bolt 49 is screwed to the first fixing nut 45 via the first fixing portion 54, so that a front end portion of the lid member 65 is fastened together with the rear fender main body 13 to the partition wall 12 at two positions, and the left and right side wall portions 66 of the lid member 65 are fixed to the left and right side walls 61 of the bulging portion 14 with screws 70 (refer to FIG. 7) respectively.

After passing through the first wiring holes 36 as shown in FIG. 5 and FIG. 6, the electrical wire 31 for the lighting device which is wired along the upper stay pipe 15 as shown in FIG. 2 is connected to the left and right direction indicators 68 through the left and right wiring holes 63 for direction indicator, and is connected to the license plate lamp 69 through the wiring hole for license plate lamp 64 as shown in FIGS. 5 to 7.

According to the rear fender structure for the motorcycle 1 of the embodiment of the present disclosure as described above, as indicated by the arrows in FIG. 5, muddy water, rainwater or the like that is brought up by the rear wheel 3 while the motorcycle 1 is traveling and scattered in a tangential direction from an outer periphery of the rear wheel 3 can be blocked by the lower protruding portion 33 provided on the fender stay. Further, muddy water, rainwater or the like on an upper part of the rear fender main body 13 can be blocked by the upper protruding portion 32 provided on the fender stay. Therefore, muddy water, rainwater or the like can be prevented from entering into the wiring chamber 60 through the first wiring hole 36 without increasing the manufacturing cost.

Further, the lower protruding portion 33 is provided so as to protrude to a center side of the rear wheel 3 with respect to a tangent line t (see FIG. 5) to the rear wheel 3 passing through an upper edge 36a of the first wiring hole 36, so that the muddy water, rainwater or the like coming from the rear wheel 3 can be reliably blocked from entering directly into the first wiring hole 36.

According to the rear fender structure 10 for the motorcycle 1 of the embodiment of the present disclosure as described above, the upper protruding portion 32 and the lower protruding portion 33 are used for the upper and lower stay pipes 15, 16 as well, so that there is no need to add a dedicated member, and the cost reduction effect can be expected.

The present disclosure can be appropriately changed within a scope not contrary to the gist or idea of the present disclosure which can be read from the entire claims and the specification, and a rear fender structure with such a change is also included in the technical concept of the present disclosure.

What is claimed is:

1. A motorcycle rear fender structure provided at a rear part of a motorcycle, the motorcycle rear fender structure comprising:
a fender stay extending to an upper rear side from one side of left and right rear swing arms rotatably supporting a rear wheel of the motorcycle;
a rear fender main body that covers an upper rear side of the rear wheel;
a bulging portion that bulges outward and rearward from the rear fender main body integrally, the bulging portion in which a wiring chamber is formed; and
a partition wall supported by the fender stay and provided in the rear fender main body,
wherein the partition wall is provided with a wiring hole for introducing an electrical wire connected to a lighting device into the wiring chamber, and the fender stay is provided with a lower protruding portion extending in a left-right direction at a lower side of the wiring hole in the rear fender main body.

2. The motorcycle rear fender structure according to claim 1, wherein the fender stay is provided with an upper protruding portion extending in the left-right direction at an upper side of the wiring hole in the rear fender main body, the fender stay is comprised of upper and lower stay pipes, and the upper protruding portion and the lower protruding portion are respectively configured by the upper and lower stay pipes.

3. The motorcycle rear fender structure according to claim 1, wherein the lower protruding portion is provided so as to protrude to a center side of the rear wheel with respect to a tangent line to the rear wheel passing through an upper edge of the wiring hole.

* * * * *